US010935291B2

(12) United States Patent
DeLuca et al.

(10) Patent No.: US 10,935,291 B2
(45) Date of Patent: Mar. 2, 2021

(54) INTERNAL CLIMATE CONTROL SYSTEM

(71) Applicant: INTERNATIONAL BUSINESS MACHINES CORPORATION, Armonk, NY (US)

(72) Inventors: Lisa Seacat DeLuca, Baltimore, MD (US); Kelley Anders, East New Market, MD (US); Jeremy R. Fox, Georgetown, TX (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 16/176,211

(22) Filed: Oct. 31, 2018

(65) Prior Publication Data
US 2020/0132352 A1 Apr. 30, 2020

(51) Int. Cl.
*F25B 49/00* (2006.01)
*G08B 21/18* (2006.01)

(52) U.S. Cl.
CPC .......... *F25B 49/005* (2013.01); *G08B 21/182* (2013.01)

(58) Field of Classification Search
CPC ................... B60H 1/00014; B60H 1/3205; B60H 1/3226; F25D 11/003; F25D 2600/06; F25D 2700/16; G05D 23/1927; G05D 23/193; G05D 23/1931
See application file for complete search history.

(56) References Cited

U.S. PATENT DOCUMENTS

| | | | |
|---|---|---|---|
| 8,188,845 B2 | 5/2012 | Abernethy, Jr. | |
| 2013/0340444 A1 | 12/2013 | Bryant | |
| 2017/0131015 A1 | 5/2017 | Farrar | |
| 2017/0138662 A1 | 5/2017 | Satou | |
| 2018/0001731 A1* | 1/2018 | Vehr | ............ B60H 1/3211 |

(Continued)

FOREIGN PATENT DOCUMENTS

| | | |
|---|---|---|
| JP | 2001147065 A | 5/2001 |
| WO | 20170175041 A1 | 2/2017 |
| WO | 20172187881 A1 | 12/2017 |

OTHER PUBLICATIONS

Ashby, B. Hunt; Protecting Perishable Foods During Transport by Truck; Agricultural Marketing Service, Transportation and Marketing Programs; Sep. 1995 (reprinted Jul. 2008) 97 pages.

*Primary Examiner* — Nelson J Nieves
(74) *Attorney, Agent, or Firm* — Schmeiser, Olsen & Watts; Stephanie Carusillo

(57) ABSTRACT

A method and system for enabling climate control is provided. The method includes monitoring a refrigerated section of a vehicle. The refrigerated section includes a first cargo container comprising a first cargo type and first sensors describing the first cargo type. A cooling apparatus of the vehicle is currently maintaining a first specified temperature range within the refrigerated section. Second integrated cargo sensors describing a second cargo type of a second cargo container being placed within the refrigerated section of the vehicle are detected and associated data is analyzed. A second specified temperature range for storing the second cargo type is determined and compared to the first specified temperature range. An associated difference is compared to a temperature range threshold value and a response action associated with the first cargo container and the second cargo container is executed.

20 Claims, 7 Drawing Sheets

(56) References Cited

U.S. PATENT DOCUMENTS

2018/0031291 A1* 2/2018 Kondrk ................ F25B 49/022
2018/0236840 A1* 8/2018 Cantrell ............. B60H 1/00014
2019/0023102 A1* 1/2019 Bryan ................ B60H 1/00842

* cited by examiner

US 10,935,291 B2

INTERNAL CLIMATE CONTROL SYSTEM

FIELD

The present invention relates generally to climate control and in particular to improving internal climate control by monitoring an internal climate controlled region and activating a resulting response action associated with detected objects in the internal climate controlled region.

BACKGROUND

Determining conditions for object storage typically includes an inaccurate process with little flexibility. Addressing specific object storage requirements and issues may involve an unreliable process that may be time consuming and require a large amount of resources. Accordingly, there exists a need in the art to overcome at least some of the deficiencies and limitations described herein above.

SUMMARY

A first aspect of the invention provides an internal climate control method comprising: continuously monitoring, by a processor of a controller hardware device via a plurality of detection sensors of a vehicle, a refrigerated section of the vehicle, wherein the refrigerated section of the vehicle comprises a first cargo container comprising a first cargo type and first integrated cargo sensors describing the first cargo type, and wherein a cooling apparatus of the vehicle is currently maintaining a first specified temperature range within the refrigerated section of the vehicle based on detecting the first integrated cargo sensors; detecting in response to the continuously monitoring, by the processor via the plurality of detection sensors, second integrated cargo sensors describing a second cargo type of a second cargo container being placed within the refrigerated section of the vehicle; analyzing, by the processor, data retrieved via the second integrated cargo sensors; determining, by the processor based on results of the analyzing, a second specified temperature range for storing the second cargo type; comparing, by the processor, the first specified temperature range to the second specified temperature range; comparing, by the processor, a difference between the first specified temperature range and the second specified temperature range to a temperature range threshold value; determining, by the processor, that the difference exceeds the temperature range threshold value; and activating, by the processor in response to the determining that the difference exceeds the temperature range threshold value, a response action associated with the first cargo container and the second cargo container.

A second aspect of the invention provides a computer program product, comprising a computer readable hardware storage device storing a computer readable program code, the computer readable program code comprising an algorithm that when executed by a computer processor of a controller hardware device implements an internal climate control method, the method comprising: continuously monitoring, by the processor via a plurality of detection sensors of a vehicle, a refrigerated section of the vehicle, wherein the refrigerated section of the vehicle comprises a first cargo container comprising a first cargo type and first integrated cargo sensors describing the first cargo type, and wherein a cooling apparatus of the vehicle is currently maintaining a first specified temperature range within the refrigerated section of the vehicle based on detecting the first integrated cargo sensors; detecting in response to the continuously monitoring, by the processor via the plurality of detection sensors, second integrated cargo sensors describing a second cargo type of a second cargo container being placed within the refrigerated section of the vehicle; analyzing, by the processor, data retrieved via the second integrated cargo sensors; determining, by the processor based on results of the analyzing, a second specified temperature range for storing the second cargo type; comparing, by the processor, the first specified temperature range to the second specified temperature range; comparing, by the processor, a difference between the first specified temperature range and the second specified temperature range to a temperature range threshold value; determining, by the processor, that the difference exceeds the temperature range threshold value; and activating, by the processor in response to the determining that the difference exceeds the temperature range threshold value, a response action associated with the first cargo container and the second cargo container.

A third aspect of the invention provides a controller hardware device comprising a computer processor coupled to a computer-readable memory unit, the memory unit comprising instructions that when executed by the computer processor implements an internal climate control method comprising: continuously monitoring, by the processor via a plurality of detection sensors of a vehicle, a refrigerated section of the vehicle, wherein the refrigerated section of the vehicle comprises a first cargo container comprising a first cargo type and first integrated cargo sensors describing the first cargo type, and wherein a cooling apparatus of the vehicle is currently maintaining a first specified temperature range within the refrigerated section of the vehicle based on detecting the first integrated cargo sensors; detecting in response to the continuously monitoring, by the processor via the plurality of detection sensors, second integrated cargo sensors describing a second cargo type of a second cargo container being placed within the refrigerated section of the vehicle; analyzing, by the processor, data retrieved via the second integrated cargo sensors; determining, by the processor based on results of the analyzing, a second specified temperature range for storing the second cargo type; comparing, by the processor, the first specified temperature range to the second specified temperature range; comparing, by the processor, a difference between the first specified temperature range and the second specified temperature range to a temperature range threshold value; determining, by the processor, that the difference exceeds the temperature range threshold value; and activating, by the processor in response to the determining that the difference exceeds the temperature range threshold value, a response action associated with the first cargo container and the second cargo container.

The present invention advantageously provides a simple method and associated system capable of determining and generating required conditions for object storage.

DETAILED DESCRIPTION

Figure 1:
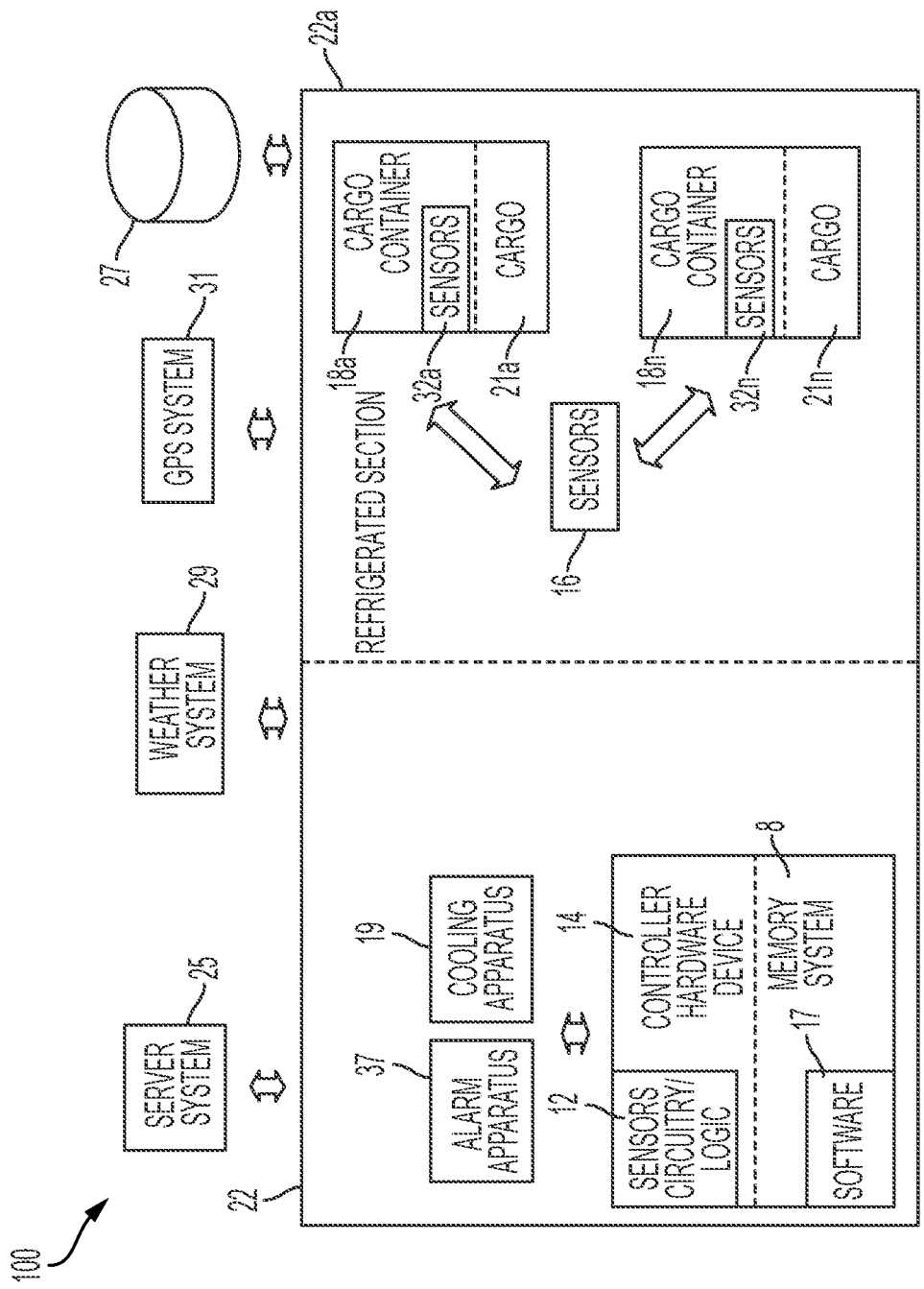
FIG. 1 illustrates a system for improving internal climate control technology by monitoring a refrigerated section of a cargo vehicle and activating a resulting response action associated with detected cargo, in accordance with embodiments of the present invention.

FIG. 1 illustrates a system for improving internal climate control technology by monitoring a refrigerated section and activating a resulting response action associated with detected cargo, in accordance with embodiments of the present invention. For clarity and ease of understanding many embodiments herein are incorporated as part of a cargo vehicle and leverage internal climate control technology. However, embodiments are not necessarily limited to only systems that are permanently integrated with cargo vehicles. For example, embodiments further encompass cargo containers that include portable refrigeration units and may be loaded and unloaded from various types of transport vehicles, e.g., cargo ships. Some such embodiments encompass portable units that can be worn or carried by a person. For example, a portable refrigeration unit that is configured for transport of medical supplies and the like and is configured to be worn as a backpack. Other embodiments encompass walk-in refrigeration units incorporated into various buildings, e.g., restaurants, production facilities, and the like. Likewise, other embodiments encompass household appliances. Such walk-in refrigeration units and household appliances include one or multiple refrigeration sections that leverage the present invention to control the climate of a given refrigeration section. System 100 is enabled to execute a process for automatically detecting (e.g., via communications between sensors 16 and sensors 32a . . . 32n) cargo (e.g., cargo 21a . . . 21n) being placed within a refrigerated section 22a of a vehicle 22 and adjusting temperature levels with respect to a determined ideal temperature range. Some embodiments leverage internet-of-things (IoT) to detect when a given object has been placed into a given refrigerated section based on determined location of signal generating devices. For example, a box has a signal generator that generated an identification signal that is detected by sensors 16 when the box in placed into refrigeration section 22a. As noted above, in some embodiments, vehicle 22 may be a vehicle in name only and may represent a structure that is either fixed in place, such as a building, or movable such as, for example, a cargo container, a backpack, or a home appliance. In general, vehicle 22 represents any structure that includes refrigeration section 22a.

System 100 enables a process for adjusting temperature levels with respect to a determined ideal temperature range as follows:

The process is initiated when sensor 16 within vehicle 22 detect sensors 32a . . . 32n associated with cargo 21a . . . 21n within cargo containers 18a . . . 18n. In response, cargo 21a . . . 21n is identified based on analysis of communications between sensor 16 and sensors 32a . . . 32n. Likewise, an optimal temperature range for storage of cargo 21a . . . 21n is determined and a cooling apparatus is automatically activated such that a temperature range within refrigerated section 22a of vehicle is maintained within the optimal temperature range.

System 100 of FIG. 1 includes a server system 25, a weather system 29, a global positioning satellite (GPS) (or any type of movement detection system) system 31, and a database 27 (comprising cargo temperature range data) communicatively connected (e.g., via a network) to a vehicle 22. The vehicle 22 includes a controller hardware device 14, an alarm apparatus, 37, a cooling apparatus 19 (e.g., a refrigeration unit for cooling or chilling a substance via usage of internal climate control technology), sensors 16a . . . 16n, and cargo containers 18a . . . 18n. Cargo containers 18a . . . 18n comprise cargo 21a . . . 21n (e.g., perishable items such as food items, medical items such as vaccines or organs, chemicals, etc.) and associated sensors 32a . . . 32n. Controller hardware device 14 may include any type of hardware apparatus(s) including, inter alia, a vehicular integrated controller computer, etc. Controller hardware device 14 includes sensors/circuitry/logic 12 and a memory system 8. Memory system 8 stores program instructions 17 for improving vehicular climate control technology by monitoring a refrigerated section of a cargo vehicle and activating a resulting response action associated with detected cargo. Controller hardware device 14 and server system 25 may each comprise a specialized hardware device comprising specialized (non-generic) hardware and circuitry (i.e., specialized discrete non-generic analog, digital, and logic-based circuitry) for executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing a process for improving vehicular climate control technology by monitoring a refrigerated section of a cargo vehicle and activating a resulting response action associated with detected cargo). Controller hardware device 14 may include an electrical and/or mechanical switching mechanism (for automatically controlling alarm apparatus 37 and cooling apparatus 19) that may include proprietary specially designed electro/mechanical components (e.g., circuitry, switching relay, etc.). Sensors 16 may include any type of sensors for detecting cargo 21a . . . 21n via sensors 32a . . . 32n. Sensors 16 and sensors 32a . . . 32n may include, inter alia, GPS sensor, optical sensors, temperature sensors, NFC sensors, Bluetooth sensors, video cameras, infrared sensors, moisture sensors, pressure sensors, motion detector sensors, RFID sensors, etc. Weather system 29 provides weather related information to controller hardware apparatus for additional information for enabling a temperature adjustment within refrigerated section. For example, weather system may indicate that a temperature will exceed 90 degrees at a specified time and therefore, the cooling apparatus 19 should be enabled at the specified time to account for a higher external temperature that will affect the internal temperature within vehicle 22. GPS system is configured detect vehicle movement and provide location and mapping information for vehicle 22.

Vehicle 22 movement detection may include any type of movement detection methods (via usage of sensors 16) including, inter alia, global positioning satellite (GPS) tracking/movement detection methods (including triangulation motion detection methods), micro electro-mechanical system (MEMS) methods, Wi-Fi positioning methods, a cellular tower triangulation process, etc.

MEMS methods are enabled to detect acceleration movement (i.e., via an accelerometer and a gyroscope) used to trigger requests for positioning information. Therefore, MEMS enables a process for periodically requesting a current location and comparing the current location to prior location requests thereby determining movement, direction, and speed.

A Wi-Fi positioning method comprises a localization technique (used for positioning with wireless access points) based on a process for measuring an intensity of a received signal (i.e., received signal strength in English RSS) and a process comprising finger printing. An accuracy of a Wi-Fi positioning method depends on a number of positions entered into a database.

A GPS tracking method (i.e., comprising a triangulation of geo synchronous satellites) comprises a location based service.

A cellular tower triangulation process uses a location area code (LAC) and a Cell ID of an associated cell tower currently connected to an associated cellular telephone to determine a position of the currently connected cellular telephone resulting in data usage from at least three cellular towers. The cellular tower triangulation process calculates a handset's location precisely. Each base station covers a specified geographical area.

The following description is associated with a process flow enabled by system 100:

The process is initiated when cargo 21a . . . 21n (within cargo containers 18a . . . 18n) and associated sensors 32a . . . 32n are loaded into refrigerated section 22a of vehicle 22 (e.g., a refrigerated tractor trailer, a box truck, a railroad car, a ship, an aircraft, etc.). Cargo 21a . . . 21n and/or cargo containers 18a . . . 18n are equipped with sensors 32a . . . 32n such as, inter alia, RFID sensors, NFC sensors, Bluetooth sensors, video sensors, etc. Sensors 32a . . . 32n generate a signal comprising information describing, inter alia, a name and type of cargo 21a . . . 21n, an ideal temperature range for maintaining cargo 21a . . . 21n (alternatively or additionally the ideal temperature may be retrieved from database 27). Sensors 16 within vehicle 22 are configured to communicate with retrieve data from sensors 32a . . . 32n to determine an optimal range of temperatures for cargo 21a . . . 21n. The optimal range of temperatures for cargo 21a . . . 21n are compared to an actual temperature detected (e.g., via sensors 16) within refrigerated section 22a and if the actual temperature varies from the optimal range of temperatures, controller hardware device 14 is enabled to:

1. Command cooling apparatus 19 to adjust the actual temperature accordingly.
2. Command alarm apparatus to issue an alert (e.g., visual, audible, vibrational, etc.) indicating that the temperature should be modified.

If the actual temperature varies from the optimal range of temperatures by a significant amount, controller hardware device 14 may execute an energy optimization process and/or a cargo safety process. An energy optimization process may include generating a suggestion for removing or combining any of cargo containers 18a . . . 18n to achieve better energy saving results. For example, an LED on a cargo container may turn red to indicate that cargo container should be moved and matched with other similar cargo. A cargo safety process may include maintaining a minimum temperature for maintaining safe cargo handling. For example, chicken must be refrigerated but bananas may be stored at 90 degrees, therefore the temperature is adjusted to a refrigeration temperature. As new cargo is added or removed, the temperatures may be further adjusted.

Figure 2:
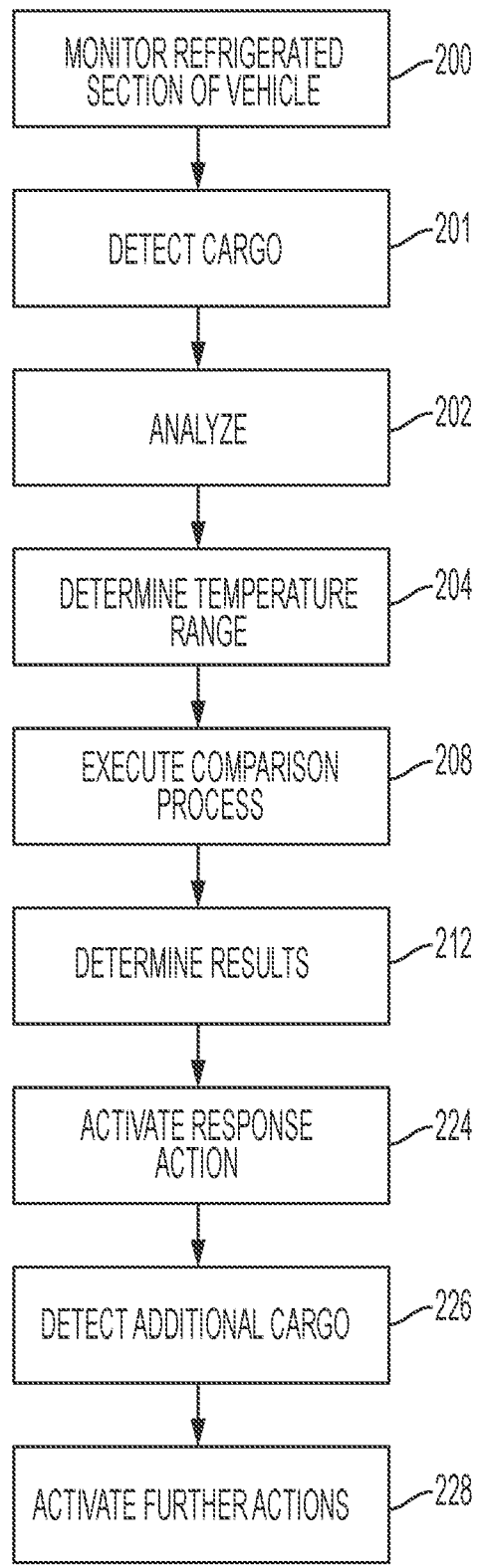
FIG. 2 illustrates a flowchart detailing a process enabled by the system of FIG. 1 for improving internal climate control technology by monitoring a refrigerated section of a cargo vehicle and activating a resulting response action associated with detected cargo, in accordance with embodiments of the present invention.

FIG. 2 illustrates a flowchart detailing a process enabled by system 100 of FIG. 1 for improving vehicular climate control technology by monitoring a refrigerated section of a cargo vehicle and activating a resulting response action associated with detected cargo, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by controller hardware device 140. In step 200, a refrigerated section of a vehicle is continuously monitored via detection sensors within the vehicle. For example, the refrigerated section of the vehicle includes a first cargo container comprising a first cargo type and first integrated cargo sensors describing the first cargo type. Additionally, a cooling apparatus (e.g., a refrigeration unit) of the vehicle is currently maintaining a first specified temperature range (associated with the first cargo type) within the refrigerated section of the vehicle based on detecting the first integrated cargo sensors. Additionally, before loading the first cargo container in the refrigerated section of the vehicle a temperature of a refrigeration apparatus of may be maintained for a specified amount of time and alert indicating that the first cargo container being may be placed within the refrigerated section of the vehicle may be issued.

In step 201, second integrated cargo sensors are detected in response to continuous monitoring of step 200. The second integrated cargo sensors describe a second cargo type of a second cargo container being placed within the refrigerated section of the vehicle. In step 202, data retrieved via the second integrated cargo sensors are analyzed. In step 204, a second specified temperature range for storing the second cargo type is determined based on results of the analysis of step 202. In step 208, the first specified temperature range is compared to the second specified temperature range. Additionally, a difference between the first specified temperature range and the second specified temperature range is compared to a temperature range threshold value. In step 212, it is determined that the difference exceeds the temperature range threshold value. In step 224 (in response to results of step 212), a response action associated with the first cargo container and the second cargo container is executed. The response action may include: generating a warning indicating said that the difference exceeds the temperature range threshold value and presenting the alarm to an individual associated with the vehicle (e.g., a driver). The warning may further indicate a removal action for removing the first cargo container or the second cargo container from the vehicle. Alternatively, the response action may include: determining a third specified temperature range configured for maintaining the first cargo type and the second cargo type (each comprising perishable items such as food or medical items); and adjusting a temperature of the refrigeration apparatus of the vehicle such that the third specified temperature range is maintained within the refrigerated section of the vehicle. As second alternative, the response action may include determining a second specified temperature range configured for maintaining an energy usage optimization plan with respect to the refrigeration apparatus of the vehicle for maintaining the first cargo type and the second cargo type; and automatically controlling the refrigeration apparatus such that the second specified temperature range is maintained within the refrigerated section of the vehicle.

In step 226, third integrated cargo sensors describing a third cargo type of a third cargo container being placed within the refrigerated section of the vehicle are detected via the continuous monitoring of step 200 and the aforementioned third specified temperature range is additionally determined for storing said third cargo type. In response, an analysis and comparison process (similar to steps 202-212) is executed and in response in step 228, an additional response action associated with the first cargo container, the second cargo container, and third cargo container is executed. For example, the first specified temperature range is compared to the second specified temperature range and the third specified temperature range. Additionally, differences between the first specified temperature range, the second specified temperature range, and the third specified temperature range are compared to an additional temperature range threshold value and it is determined that at least one of the differences (between the first specified temperature range, the second specified temperature range, and the third specified temperature range) exceeds the additional temperature range threshold value. The additional response action may include: adjusting a first temperature associated with a first zone (i.e., comprising the first cargo container and the second cargo container) of a refrigeration apparatus of the vehicle such that a specified temperature range is maintained within the first zone of the of the refrigeration apparatus of the vehicle; and adjusting a second temperature associated with a second zone (i.e., comprising the third cargo container) of the refrigeration apparatus such that a differing specified temperature range is maintained within the second zone.

Figure 3:
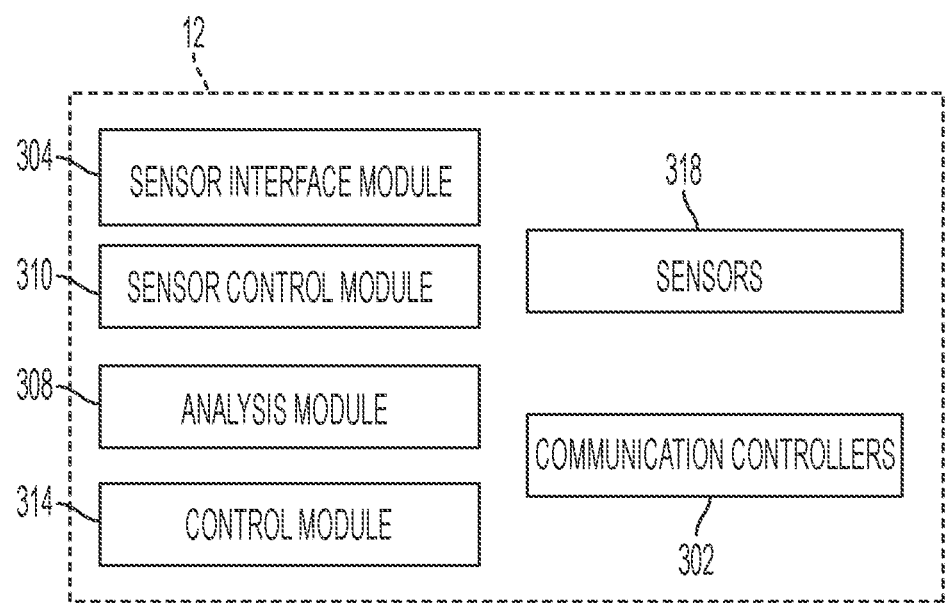
FIG. 3 illustrates an internal structural view of the sensors/circuitry/logic of FIG. 1, in accordance with embodiments of the present invention.

FIG. 3 illustrates an internal structural view of sensors/circuitry/logic 12 of FIG. 1, in accordance with embodiments of the present invention. Sensors/circuitry/logic 12 includes sensors 318, a sensor interface module 304, a sensor control module 310, an analysis module 308, a control module 314, and communication controllers 302. Sensors 318 may include any type of internal or external sensors including, inter alia, GPS sensors, voltage sensors, network traffic sensors, video retrieval devices, moisture sensors, temperature sensors, pressure sensors, etc. Sensor interface module 304 comprises specialized hardware and software for controlling all functions related to interfacing with sensors 318, sensors 16, and sensors 32a . . . 32n. Sensor control module 310 comprises specialized hardware and software for controlling all functionality related to controlling all functions related to control of the sensors 318, sensors 16, and sensors 32a . . . 32n and implementing the process described with respect to the algorithm of FIG. 2. Analysis module 308 comprises specialized hardware and software for controlling all functions related the analysis step 202 of FIG. 2. Control module 314 comprises specialized hardware and software for controlling all functions related to increasing and decreasing a temperature range via control of cooling apparatus 19 as described, supra. Communication controllers 502 are enabled for controlling all communications between sensors 318, sensor interface module 304, sensor control module 310, analysis module 308, and control module 314.

Figure 4:
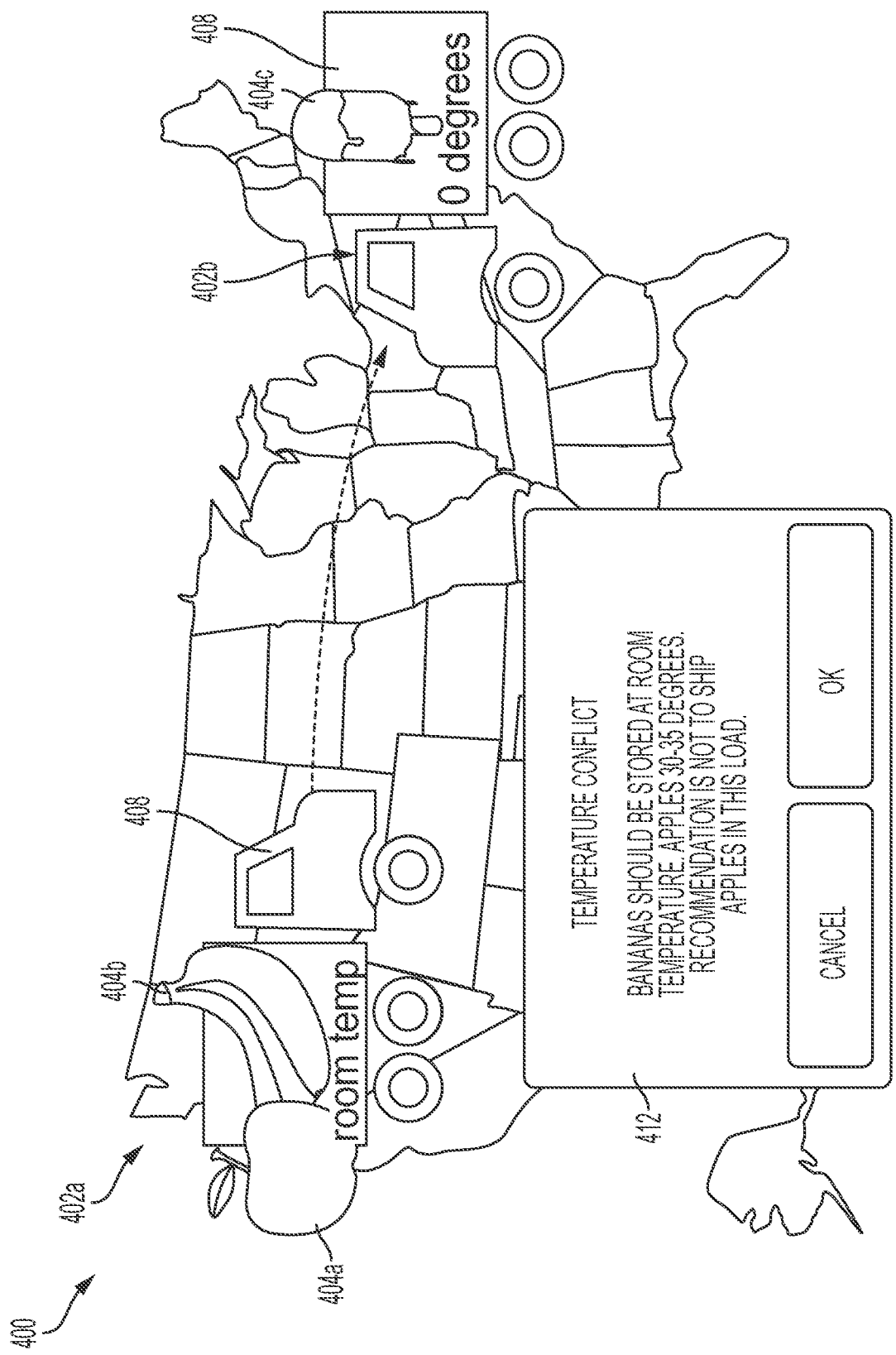
FIG. 4 illustrates an implementation example for providing a system for transporting products between locations, in accordance with embodiments of the present invention.

FIG. 4 illustrates an implementation example for providing a system 400 for transporting products between locations, in accordance with embodiments of the present invention. System 400 illustrates a vehicle 408 being loaded with cargo 404a (apples) and 404b (bananas) for shipment from a location 402a (e.g., California) to a location 404b (e.g., New York). System 400 determines that an ideal temperature for storing apples is between 30 and 35 degrees Fahrenheit and an ideal temperature for storing bananas is 70 degrees. Therefore, a driver loads the bananas into vehicle 404 and when a first container of apples is loaded, system 400 issues an alert (e.g., via a GUI 412) indicating that that there is a mismatch between temperature requirements for bananas and apples and recommends that the driver transports the apples during a different trip. Subsequently, the bananas are shipped to location 402b and upon delivering the bananas, a shipment of cargo 404c (i.e., ice cream) is loaded on vehicle 408 for a return trip back to location 402a. In response, system 400 recognizes that the bananas have been removed and the ice cream has been added and therefore the temperature within the cargo section of vehicle 408 is reduced to zero degrees Fahrenheit for accommodating the ice cream.

Figure 5:
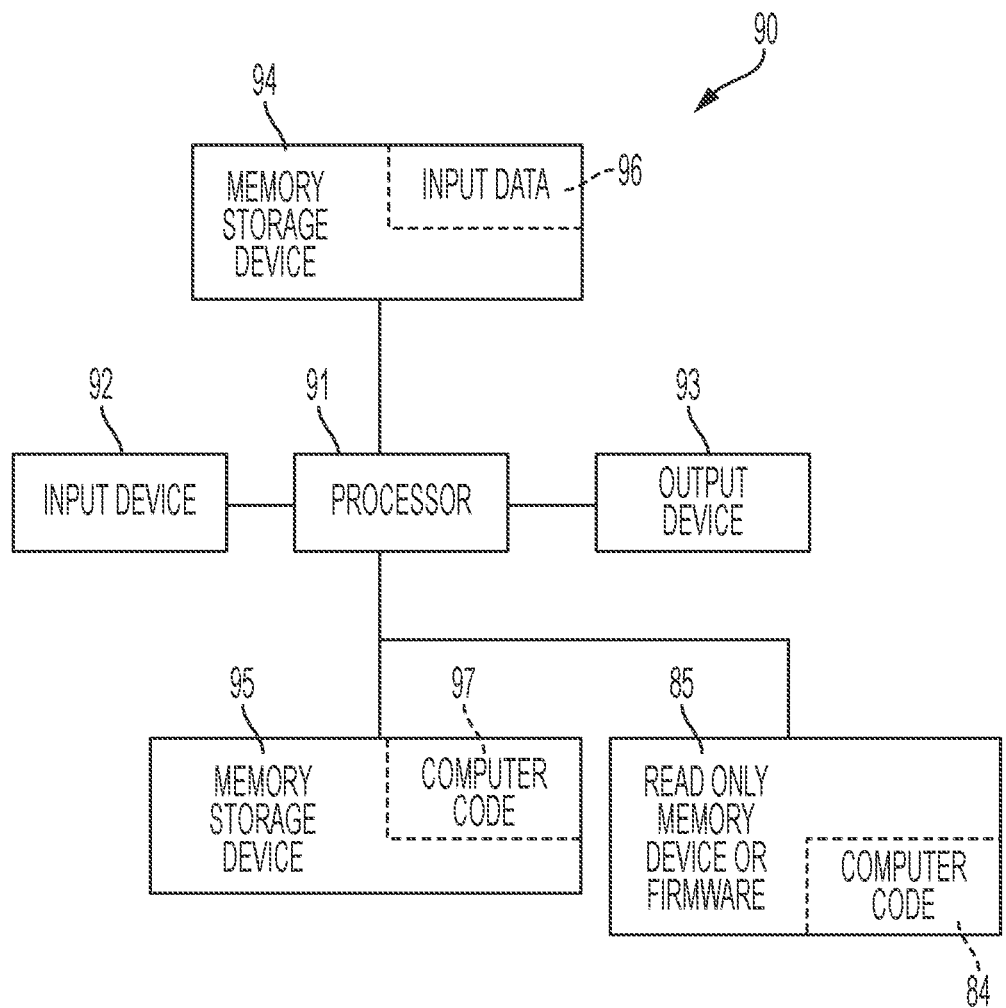
FIG. 5 illustrates a computer system for improving internal climate control technology by monitoring a refrigerated section of a cargo vehicle and activating a resulting response action associated with detected cargo, in accordance with embodiments of the present invention.

FIG. 5 illustrates a computer system 90 (e.g., controller hardware device computer 14) for improving vehicular climate control technology by monitoring a refrigerated section of a cargo vehicle and activating a resulting response action associated with detected cargo, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving vehicular climate control technology by monitoring a refrigerated section of a cargo vehicle and activating a resulting response action associated with detected cargo. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve vehicular climate control technology by monitoring a refrigerated section of a cargo vehicle and activating a resulting response action associated with detected cargo. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for improving vehicular climate control technology by monitoring a refrigerated section of a cargo vehicle and activating a resulting response action associated with detected cargo. In another embodiment, the invention provides a business method that performs the process steps of the invention on a subscription, advertising, and/or fee basis. That is, a service supplier, such as a Solution Integrator, could offer to improve vehicular climate control technology by monitoring a refrigerated section of a cargo vehicle and activating a resulting response action associated with detected cargo. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
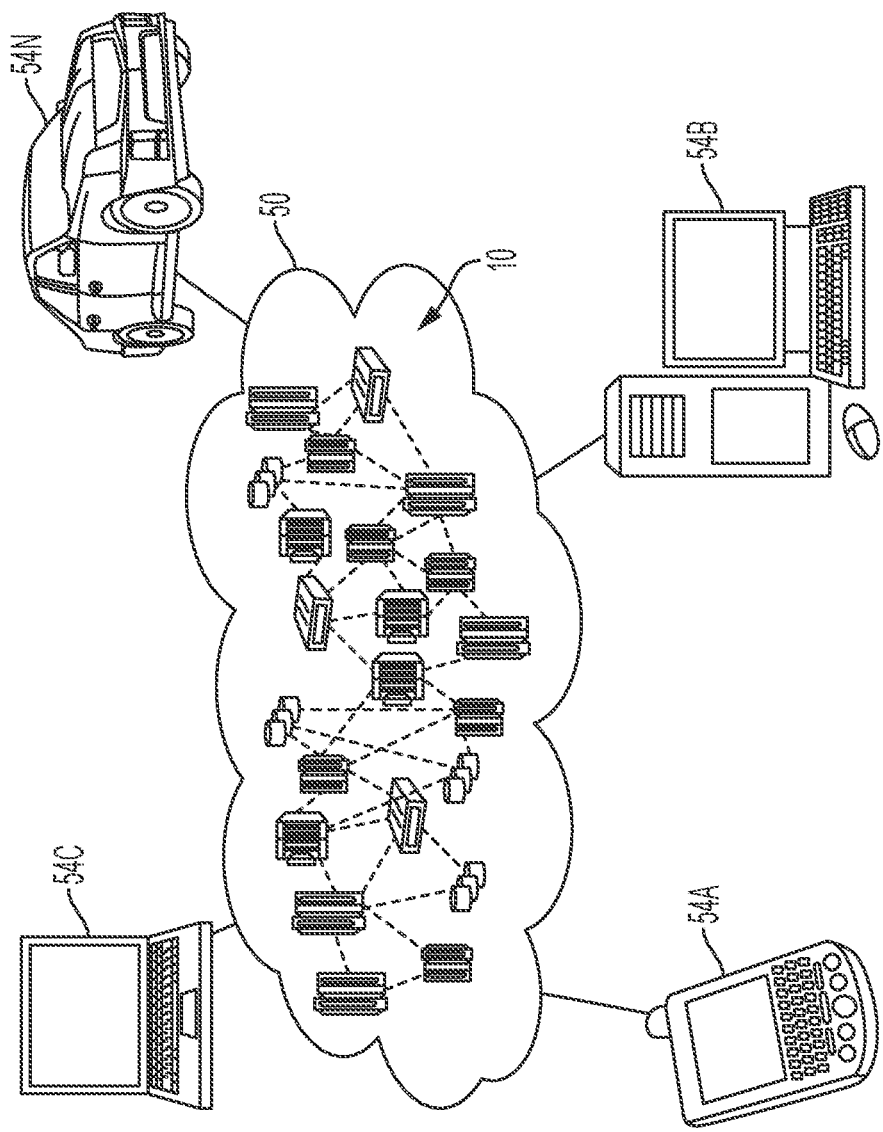
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
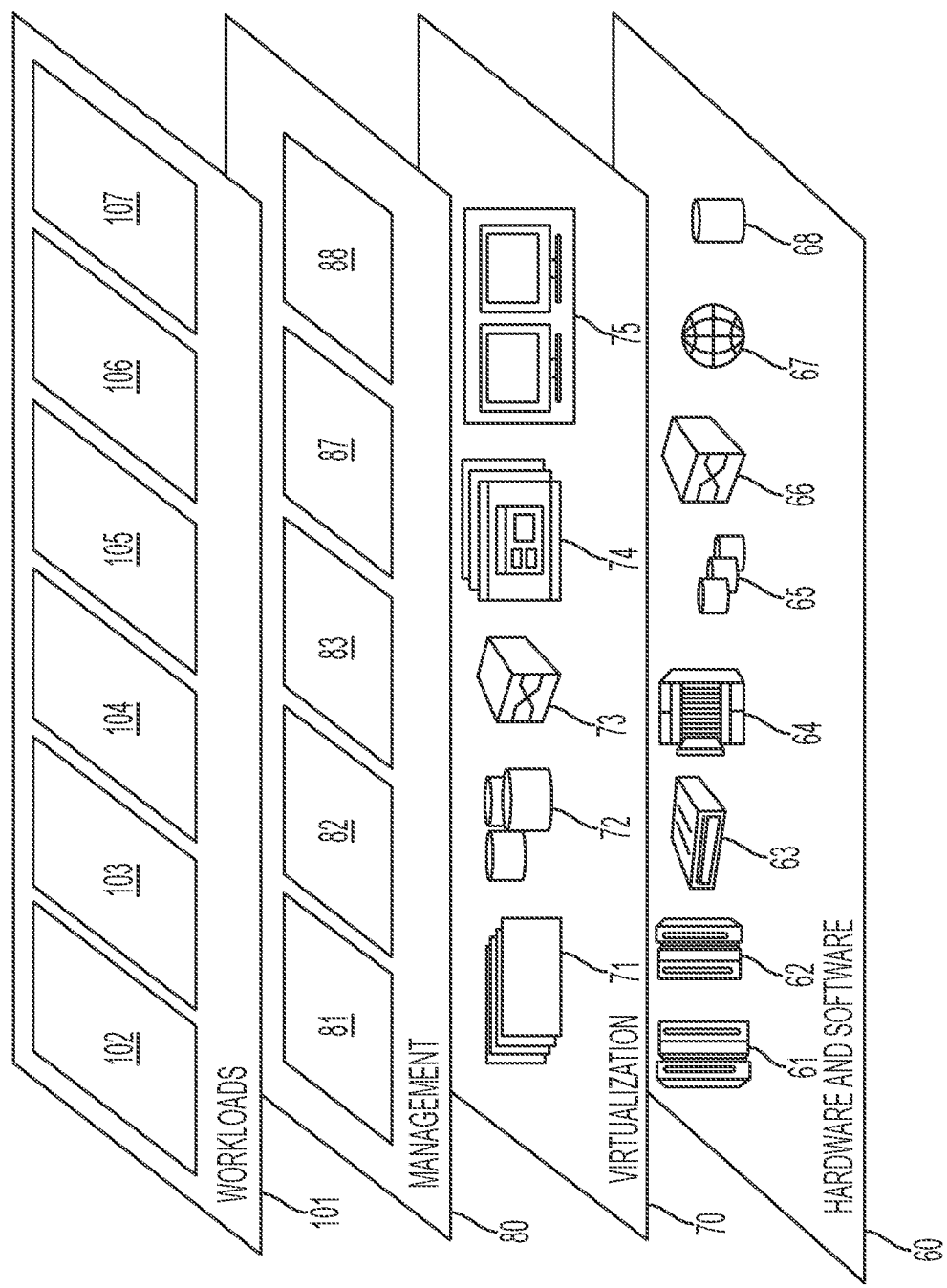
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving vehicular climate control technology by monitoring a refrigerated section of a cargo vehicle and activating a resulting response action associated with detected cargo 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An internal climate control method comprising:
    continuously monitoring, by a processor of a controller hardware device via a plurality of detection sensors of a vehicle, a refrigerated section of said vehicle, wherein said refrigerated section of said vehicle comprises a first cargo container comprising a first cargo type and first integrated cargo sensors describing said first cargo type, and wherein a refrigeration unit of said vehicle is currently adjusting a temperature level thereby controlling a climate of said refrigerated section and maintaining a first specified temperature range within said refrigerated section of said vehicle based on detecting said first integrated cargo sensors;
    detecting in response to said continuously monitoring, by said processor via said plurality of detection sensors, second integrated cargo sensors describing a second cargo type of a second cargo container being placed within said refrigerated section of said vehicle;
    analyzing, by said processor, data retrieved via said second integrated cargo sensors;
    determining, by said processor based on results of said analyzing, a second specified temperature range for storing said second cargo type;
    comparing, by said processor, said first specified temperature range to said second specified temperature range;
    comparing, by said processor, a difference between said first specified temperature range and said second specified temperature range to a temperature range threshold value;
    determining, by said processor, that said difference exceeds said temperature range threshold value; and
    activating, by said processor in response to said determining that said difference exceeds said temperature range threshold value, a response action associated with said first cargo container and said second cargo container.

2. The method of claim 1, wherein said activating said response action comprises:
    generating a warning indicating said that said difference exceeds said temperature range threshold value; and
    presenting said alarm to an individual associated with said vehicle.

3. The method of claim 2, wherein said warning further indicates a removal action for removing said first cargo container or said second cargo container from said vehicle.

4. The method of claim 1, wherein said first cargo type and said second cargo type each comprise perishable items, and wherein said activating said response action comprises:

determining a third specified temperature range configured for maintaining said first cargo type and said second cargo type; and
adjusting a temperature of said refrigeration unit of said vehicle such that said third specified temperature range is maintained within said refrigerated section of said vehicle.

5. The method of claim 4, wherein said perishable items comprise items selected from the group consisting of food associated items and medical associated supplies.

6. The method of claim 1, wherein said activating said response action comprises:
determining that said second specified temperature range is configured for maintaining an energy usage optimization plan with respect to said refrigeration unit of said vehicle maintaining said first cargo type and said second cargo type; and
automatically controlling said refrigeration unit of said vehicle such that said second specified temperature range is maintained within said refrigerated section of said vehicle.

7. The method of claim 1, further comprising:
detecting in response to said continuously monitoring, by said processor via said plurality of detection sensors, third integrated cargo sensors describing a third cargo type of a third cargo container being placed within said refrigerated section of said vehicle;
analyzing, by said processor, a signal broadcast via said third integrated cargo sensors;
determining, by said processor based on results of said analyzing, a third specified temperature range for storing said third cargo type;
comparing, by said processor, said first specified temperature range to said second specified temperature range and said third temperature range;
comparing, by said processor, differences between said first specified temperature range, said second specified temperature range, and said third temperature range to an additional temperature range threshold value;
determining, by said processor, that at least one of said differences exceed said additional temperature range threshold value;
comparing, by said processor, said first specified temperature range to said second specified temperature range;
comparing, by said processor, a difference between said first specified temperature range and said second specified temperature range to a temperature range threshold value;
determining, by said processor, that said difference exceeds said temperature range threshold value; and
activating, by said processor in response to said determining that said differences exceed said additional temperature range threshold value, an additional response action associated with said first cargo container, said second cargo container, and said third cargo container.

8. The method of claim 1, further comprising:
detecting in response to said continuously monitoring, by said processor via said plurality of detection sensors, third integrated cargo sensors describing a third cargo type of a third cargo container being placed within said refrigerated section of said vehicle;
analyzing, by said processor, data retrieved via said third integrated cargo sensors;
determining, by said processor based on results of said analyzing, a third specified temperature range for storing and maintaining said third cargo type;
adjusting, by said processor, a first temperature associated with a first zone of said refrigeration unit of said vehicle such that said second specified temperature range is maintained within said first zone of said refrigeration unit of said vehicle, wherein said first cargo container and said second cargo container are both located within said first zone; and
adjusting, by said processor, a second temperature associated with a second zone of said refrigeration unit such that said third specified temperature range is maintained within said second zone, wherein said third container is located within said second zone.

9. The method of claim 1, wherein said first cargo type and said second cargo type each comprise perishable items, and wherein said method further comprises:
before loading said first cargo container and said second cargo container in said refrigerated section of said vehicle, adjusting, by said processor, a temperature of said refrigeration unit of said vehicle such that said second specified temperature range is maintained within said refrigerated section of said vehicle.

10. The method of claim 1, further comprising:
providing at least one support service for at least one of creating, integrating, hosting, maintaining, and deploying computer-readable code in the controller hardware device, said code being executed by the processor to implement: said continuously monitoring, said detecting, said analyzing, said determining said second specified temperature range, said comparing said first specified temperature range, said comparing said difference, said determining that said difference exceeds said temperature range threshold value; and said activating.

11. A computer program product for enabling internal climate control, the computer program product comprising:
one or more computer readable storage media, and program instructions collectively stored on the one or more computer readable storage media, the program instructions comprising:
first program instructions executed by a computer processor of a controller hardware device to cause the computer processor to continuously monitor via a plurality of detection sensors of a vehicle, a refrigerated section of said vehicle, wherein said refrigerated section of said vehicle comprises a first cargo container comprising a first cargo type and first integrated cargo sensors describing said first cargo type, and wherein a cooling apparatus of said vehicle is currently maintaining a first specified temperature range within said refrigerated section of said vehicle based on detecting said first integrated cargo sensors;
second program instructions executed by said computer processor to cause the computer processor to detect in response to execution of said first program instructions via said plurality of detection sensors, second integrated cargo sensors describing a second cargo type of a second cargo container being placed within said refrigerated section of said vehicle;
third program instructions executed by said computer processor to cause the computer processor to analyze data retrieved via said second integrated cargo sensors;
fourth program instructions executed by said computer processor to cause the computer processor to determine based on results of execution of said third program instructions, a second specified temperature range for storing said second cargo type;
fourth program instructions executed by said computer processor to cause the computer processor to compare said first specified temperature range to said second specified temperature range;
fifth program instructions executed by said computer processor to cause the computer processor to compare a difference between said first specified temperature range and said second specified temperature range to a temperature range threshold value;
sixth program instructions executed by said computer processor to cause the computer processor to determine that said difference exceeds said temperature range threshold value; and
seventh program instructions executed by said computer processor to cause the computer processor to activate in response to determining that said difference exceeds said temperature range threshold value, a response action associated with said first cargo container and said second cargo container.

12. The computer program product of claim 11, wherein activating said response action comprises:
said seventh program instructions generating a warning indicating said that said difference exceeds said temperature range threshold value; and
said seventh program instructions presenting said alarm to an individual associated with said vehicle.

13. The computer program product of claim 12, wherein said warning further indicates a removal action for removing said first cargo container or said second cargo container from said vehicle.

14. The computer program product of claim 11, wherein said first cargo type and said second cargo type each comprise perishable items, and wherein activating said response action comprises:
said seventh program instructions determining a third specified temperature range configured for maintaining said first cargo type and said second cargo type; and
said seventh program instructions adjusting a temperature of said refrigeration unit of said vehicle such that said third specified temperature range is maintained within said refrigerated section of said vehicle.

15. The computer program product of claim 14, wherein said perishable items comprise items selected from the group consisting of food associated items and medical associated supplies.

16. The computer program product of claim 11, wherein activating said response action comprises:
said seventh program instructions determining that said second specified temperature range is configured for maintaining an energy usage optimization plan with respect to said refrigeration unit of said vehicle maintaining said first cargo type and said second cargo type; and
said seventh program instructions automatically controlling said refrigeration unit of said vehicle such that said second specified temperature range is maintained within said refrigerated section of said vehicle.

17. The computer program product of claim 11, wherein said computer program product further comprises:
eighth program instructions executed by said computer processor to cause the computer processor to detect, via said plurality of detection sensors, third integrated cargo sensors describing a third cargo type of a third cargo container being placed within said refrigerated section of said vehicle;
ninth program instructions executed by said computer processor to cause the computer processor to analyze a signal broadcast via said third integrated cargo sensors;
tenth program instructions executed by said computer processor to cause the computer processor to determine a third specified temperature range for storing said third cargo type;
eleventh program instructions executed by said computer processor to cause the computer processor to compare said first specified temperature range to said second specified temperature range and said third temperature range;
twelfth program instructions executed by said computer processor to cause the computer processor to compare differences between said first specified temperature range, said second specified temperature range, and said third temperature range to an additional temperature range threshold value;
thirteenth program instructions executed by said computer processor to cause the computer processor to determine that at least one of said differences exceed said additional temperature range threshold value;
fourteenth program instructions executed by said computer processor to cause the computer processor to compare said first specified temperature range to said second specified temperature range;
fifteenth program instructions executed by said computer processor to cause the computer processor to compare a difference between said first specified temperature range and said second specified temperature range to a temperature range threshold value;
sixteenth program instructions executed by said computer processor to cause the computer processor to determine that said difference exceeds said temperature range threshold value; and
seventeenth program instructions executed by said computer processor to cause the computer processor to activate an additional response action associated with said first cargo container, said second cargo container, and said third cargo container.

18. The computer program product of claim 11, wherein said computer program product further comprises:
eighth program instructions executed by said computer processor to cause the computer processor to detect, via said plurality of detection sensors, third integrated cargo sensors describing a third cargo type of a third cargo container being placed within said refrigerated section of said vehicle;
ninth program instructions executed by said computer processor to cause the computer processor to analyze data retrieved via said third integrated cargo sensors;
tenth program instructions executed by said computer processor to cause the computer processor to determine a fourth specified temperature range for storing and maintaining said third cargo type;
eleventh program instructions executed by said computer processor to cause the computer processor to adjust a first temperature associated with a first zone of said refrigeration unit of said vehicle such that said second specified temperature range is maintained within said first zone of said refrigeration unit of said vehicle, wherein said first cargo container and said second cargo container are both located within said first zone; and
twelfth program instructions executed by said computer processor to cause the computer processor to adjust a second temperature associated with a second zone of said refrigeration unit such that said third specified temperature range is maintained within said second zone, wherein said third container is located within said second zone.

19. The computer program product of claim 11, wherein said first cargo type and said second cargo type each comprise perishable items, and wherein computer program product further comprises:

twelfth program instructions executed by said computer processor to cause the computer processor to adjust a temperature of said refrigeration unit of said vehicle such that said second specified temperature range is maintained within said refrigerated section of said vehicle.

20. A controller hardware device comprising:

a computer processor;

a computer-readable memory unit coupled to the computer processor, said computer-readable memory unit comprising instructions that when executed by the computer processor implements an internal climate control method comprising the steps of:

the controller hardware device continuously monitoring, via a plurality of detection sensors of a vehicle, a refrigerated section of said vehicle, wherein said refrigerated section of said vehicle comprises a first cargo container comprising a first cargo type and first integrated cargo sensors describing said first cargo type, and wherein a cooling apparatus of said vehicle is currently maintaining a first specified temperature range within said refrigerated section of said vehicle based on detecting said first integrated cargo sensors;

the controller hardware device detecting in response to said continuously monitoring, via said plurality of detection sensors, second integrated cargo sensors describing a second cargo type of a second cargo container being placed within said refrigerated section of said vehicle;

the controller hardware device analyzing data retrieved via said second integrated cargo sensors;

the controller hardware device determining, based on results of said analyzing, a second specified temperature range for storing said second cargo type;

the controller hardware device comparing said first specified temperature range to said second specified temperature range;

the controller hardware device comparing a difference between said first specified temperature range and said second specified temperature range to a temperature range threshold value;

the controller hardware device determining that said difference exceeds said temperature range threshold value; and the controller hardware device activating, in response to said determining that said difference exceeds said temperature range threshold value, a response action associated with said first cargo container and said second cargo container.

\* \* \* \* \*